(12) United States Patent
Mocciolo

(10) Patent No.: US 7,895,111 B2
(45) Date of Patent: Feb. 22, 2011

(54) SYSTEM AND METHOD FOR HEDGING DIVIDEND RISK

(75) Inventor: Nicholas Mocciolo, Ellington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 311 days.

(21) Appl. No.: 12/148,710

(22) Filed: Apr. 21, 2008

(65) Prior Publication Data

US 2009/0138410 A1 May 28, 2009

Related U.S. Application Data

(63) Continuation-in-part of application No. 12/002,376, filed on Dec. 17, 2007.

(60) Provisional application No. 60/962,196, filed on Jul. 27, 2007.

(51) Int. Cl.
*G06Q 40/00* (2006.01)
(52) U.S. Cl. .............................. 705/36; 705/37; 705/35; 705/39; 705/44
(58) Field of Classification Search .................. 705/36; 707/1–6, 100–104
See application file for complete search history.

(56) References Cited

U.S. PATENT DOCUMENTS 6,405,179 B1 * 6/2002 Rebane ..................... 705/36 R

| | | |
|---|---|---|
| 2002/0120542 A1 | 8/2002 | Higgins |
| 2003/0093354 A1 | 5/2003 | Marshall |
| 2004/0199459 A1 | 10/2004 | Johnston et al. |
| 2005/0086149 A1 * | 4/2005 | Efron et al. .................... 705/36 |
| 2005/0262015 A1 * | 11/2005 | Kownacki et al. ............. 705/38 |
| 2006/0206398 A1 | 9/2006 | Coughlin |
| 2006/0212380 A1 * | 9/2006 | Williams et al. .............. 705/35 |
| 2006/0271452 A1 | 11/2006 | Sparaggis |
| 2007/0162365 A1 * | 7/2007 | Weinreb ....................... 705/35 |

OTHER PUBLICATIONS

"International Financial Law Review", journal, ISSN:0262-6969, v25, n2, ps119, Feb. 2006.*
"PCT International Search Report", dated Oct. 10, 2008 for PCT/US08/08195, 2pgs.

* cited by examiner

*Primary Examiner*—Ella Colbert
*Assistant Examiner*—Hai Tran
(74) *Attorney, Agent, or Firm*—Buckley, Maschoff & Talwalkar LLC

(57) ABSTRACT

The present invention provides a method and system for determining hedging transactions to meet required characteristics of risks associated with an insurance instrument, and mitigating the risks associated with the insurance instrument by executing hedging transactions. The hedging transactions utilize dividend swap agreements to hedge first order dividend risk. In general, dividend swap derivative hedging encapsulates a dividend swap containing a payoff formula, which is a function of a notional amount, a sum of dividends payable between a start date and a end date, and a breakeven level of dividends.

21 Claims, 5 Drawing Sheets

SYSTEM AND METHOD FOR HEDGING DIVIDEND RISK

CROSS REFERENCE TO RELATED APPLICATIONS

This application is a continuation-in-part of Non-Provisional U.S. application Ser. No. 12/002,376, filed on Dec. 17, 2007, which claims the benefit of U.S. Provisional Application Ser. No. 60/962,196, filed on Jul. 27, 2007, and such specifically enumerated applications are hereby incorporated by reference.

FIELD OF THE INVENTION

The present invention generally relates to the field of hedging. More specifically, the present invention discloses a novel method and system of hedging the risks involved in providing variable annuities utilizing dividend swap contracts.

BACKGROUND OF THE INVENTION

Often, individuals will seek to guarantee a steady stream of income for situations when their regular income is either diminished or altogether unavailable (e.g. retirement, times of financial hardship, etc). Additionally, individuals may make an investment in order to expand their income at a later date. In such cases, these individuals will often invest their existing funds, in order to guarantee a stream of payments of the invested amount, as well as to receive return from the investment at a later time. This type of investment is generally known as an "annuity." An individual investing in an annuity (and upon whose life the income payments will be based) is known as an "annuitant." The individual receiving payments from the annuity is known as the "contract owner." The contract owner and the annuitant are often the same individual.

The annuity has two phases: an accumulation phase, during which the contract builds a cash value and money is added, and a payout phase, during which the funds are distributed. An annuitant may choose to purchase an annuity with a lump sum, or may make continuous payments into an annuity fund. Regardless of the payment method chosen by the annuitant, the financial or insurance institution offering an annuity will begin making periodic payments to and stop receiving funds from the annuitant on a predetermined date, this is known as "annuitization."

Two common types of annuities are known as fixed annuities ("FA") and variable annuities ("VA"). Upon annuitization, fixed annuities offer payments of predetermined value, or of sums that increase by a set percentage. Conversely, upon annuitization, variable annuities offer payments determined by the performance of a particular investment option (e.g. bonds).

With a variable annuity, the annuity contract owner bears the investment risk. The relevant life typically has a choice of investment options in which he/she can direct where the annuity deposits will be invested. These various investment options, or sub-accounts, may include stocks, bonds, money market instruments, mutual funds and the like.

Since the yield of a variable annuity is dependent on the specific sub-accounts, the risk involved in purchasing a variable annuity is proportional to the risk involved in investing in the underlying sub-accounts. While a potential annuitant may be interested in a specific investment option, the risk involved over a long period of time before annuitization may be unappealing. In such a case, the financial institution or insurance company offering the variable annuity product may elect to guarantee a certain minimum return on the annuitant's investment. Thus, the financial or insurance institution would assume some of the risk involved in purchasing a variable annuity product.

Variable annuity contracts can also provide a death benefit. Usually, during the accumulation period, this death benefit is related to the value of the underlying sub-accounts, or contract value. That is, if the sub-accounts backing the contract value have performed poorly, then the death benefit may be reduced to an insignificant amount. After annuitization, the death benefit can be a function of the remaining payments of the annuity at the time of the relevant life's death.

Annuity contracts may also provide guarantees in several different variations. A guaranteed minimum death benefit ("GMDB") is a guarantee that provides a minimum benefit at the death of the relevant life regardless of the performance of the underlying investments. A guaranteed minimum income benefit ("GMIB") is a guarantee that will provide a specified minimum income amount at the time the contract is annuitized. The income payment will be dependent on previously stated details set out in the contract.

A guaranteed minimum accumulation benefit ("GMAB") is a benefit that guarantees a specified minimum contract value at a certain date in the future, even if actual investment performance of the contract is less than the guaranteed amount. A guaranteed minimum withdrawal benefit ("GMWB") is a guarantee of income for a specified period of time, and in some versions, the income stream is guaranteed for life without requiring annuitization as in the guaranteed minimum income benefit. However, this guarantee will automatically annuitize the contract if the contract value is reduced to zero or some other amount specified in the contract or rider (as described below). Further, if the annuity contract does not provide a guarantee (e.g. GMIB, GMWB, etc.), the contract will terminate when the contract value goes to $0 or some other amount specified in the contract.

The guarantees form a class of liabilities collectively referred to as variable annuity guaranteed benefits ("VAGB"). These guarantees are known as "riders." The contract holder can purchase riders in order to guarantee a certain minimum performance criteria for underlying separate accounts. To the extent that the underlying investments do not perform in such a way so that the minimum criteria are met, the writing insurance company must subsidize the difference between the minimum performance that the VAGB guarantees and the actual performance of the underlying sub-accounts.

VAGBs can be further subdivided into several different categories, which are shown in FIG. 1. Two common categories of VAGBs 104 are variable annuity guaranteed minimum death benefits ("VAGMDB") 106 and variable annuity guaranteed living benefits ("VAGLB") 108.

The VAGMDB 106 is commonly implemented as one the following three (3) manifestations: return of premium death benefits ("ROPDB") 110, high watermark and/or periodic ratchet death benefits ("HWDB/PRDB") 112, and earnings enhancement death benefits ("EEDB").

The VAGLB 108 is commonly implemented as one the following three (3) manifestations: variable annuity guaranteed minimum accumulation benefits ("GMAB") 116, variable annuity guaranteed minimum income benefits ("GMIB") 118, and variable annuity guaranteed minimum withdrawal benefits ("GMWB") 120. This is not intended as an exhaustive list, but rather, a broad overview of the general trend of VAGBs currently available.

As previously discussed, two types of VAGBs are VAGMDB and VAGLB. The fundamental difference between VAGMDBs and VAGLBs is that the former requires that the annuitant die in order for the contract holder to realize the incremental value afforded by the guarantee. On the contrary, VAGLBs permit the contract holder to realize some or all of the benefit of the guarantee while the annuitant is living.

Naturally, regardless of the specific form taken by a particular VAGB, there is significant risk that the underlying sub-accounts perform in a manner that is inadequate to meet the minimum performance criteria. Financial and insurance institutions offering VAs are often interested in decreasing the risks entailed in the sale of a variable annuity.

Historically, many financial and insurance institutions have purchased reinsurance in an attempt to share the risk that there will be inadequate funds available to cover these guarantees. Typically, reinsurance companies spread risks by pooling the risks of multiple companies and contracts. Specifically, insurance companies pay a premium to cede a portion of their risk so that if losses are above a negotiated amount, the reinsurance company will reimburse the insurance company for these excess losses. Since the reinsurance company assumes risks from multiple companies, any losses incurred from business assumed from one insurance company are expected to be outweighed by profits from another company, thus allowing the reinsurance company to make a profit. Over the years, most reinsurers have withdrawn from providing coverage for variable annuity contracts having features such as those described above because of the high correlation among the contracts, and thus the risk could not be mitigated by pooling risks from multiple companies. Because of the inability of insurance companies to reinsure variable annuity contracts, they incurred large economic losses during the stock market decline from 2000 to 2002.

Another method of mitigating these risks is known as a "hedge," while investing in a hedge is known as "hedging." To protect the variable annuity contract holders, and to ensure the claims-paying ability of the writing insurance company, hedging programs are often maintained by insurance carriers to offset the risk associated with the riders.

Hedging is a strategy that entails making an investment, the gains of which will offset the losses of a business risk, thus allowing the hedging entity to benefit from a gain involved in a particular business transaction while offsetting losses. Commonly, hedging is used to diminish the risk factors involved in a specific investment, but can also be used to manage the risks involved in guaranteeing a minimum income to an annuitant on a variable annuity, or for a group of annuitants whose variable annuities depend on the same or similar factors.

Various strategies are being employed to manage GMWB and GMDB risks: (a) delta hedging (uncertain effectiveness since a GMWB's exposure to "vega" (implied volatility) is not hedgeable with futures, and substantial EPS (earnings per share) and economic risks remain); (b) Multi-greek hedging with futures and vanilla options (reasonably effective to hedge economic and EPS exposure over intermediate term and stable markets, but long term effectiveness is uncertain due to cost and exposure to second and third order risks); and (c) Multi-greek hedging with futures, vanilla options, and exotic equity options (reasonably effective to hedge EPS exposure over intermediate term and stable markets, but long term effectiveness is not well understood).

Hedging programs can vary significantly but generally proceed according to the following pseudo-algorithm:
Construction of a mathematical valuation model to compute an estimate of the value of the written guarantee liability, conditional upon a set of relevant capital markets data and assumptions for annuitant behavior.

Gathering required capital markets data, dependent upon the structure of the guarantee and the contractually permissible set of investment options, but generally including:
The spot price of relevant equity indices.
The term structure of interest rates denominated in all of the currencies that are reflected in the valuation model.
The spot price of relevant cross-currency exchange rates associated with all of the currency pairs that are reflected in the valuation model.
The forward implied dividend curves for each of the relevant equity indices.
A sub-model for the volatility associated with the price of the equity indices.
A sub-model for the volatility associated with the relevant cross-currency exchange rates.
A sub-model for the volatility associated with the interest rates of all relevant term structure.
Formulating assumptions of annuitant behavior, dependent upon the structure of the guarantee, but generally including:
Assumed rates of mortality for individual annuitants, or a sub-model for stochastic mortality.
Assumed rates of lapsation for individual annuitants and/or a predefined algorithm (deterministic or stochastic) for future lapsation rates that is a function of other variables in the valuation (so-called "dynamic lapsation").
Assumed rates of utilization for behavioral choices granted to the contract holder under the terms of the guarantee, such as size and frequency of periodic withdrawal of funds from the variable annuity contract and/or a predefined algorithm (deterministic or stochastic) for future utilization that is a function of other variables in the valuation ("dynamic utilization").
Size, style and frequency of transfer of funds between investment options and/or a predefined algorithm (deterministic or stochastic) for future transfers that is a function of other variables in the valuation.
Defining a series of sets of unexpected fluctuations ("shocks") to be applied to capital markets data.
Running the valuation model and computing an estimate of the valuation of the written liability under the "base case" market data and under each set of shocks. This information can be used to determine an estimate of the base valuation of the written liability and of the sensitivities of the valuation estimate to changes in specific capital markets data. (The estimate of the base valuation of the written liability and the estimate of the sensitivities of the valuation estimate to changes in specific capital markets data are known in the art as "Greeks").
Formulating a hedge portfolio and executing an analogous valuation/sensitivity exercise to calculate the base valuation and the Greeks.
Executing trades in the hedge portfolio that position the aggregated Greeks of the hedge portfolio to be within desired ranges relative to the liability Greeks.
Several useful notations are defined as follows:
$f_L^B$ is the liability valuation under the base case set of capital markets assumptions
$\delta_L$ is the liability delta
$\kappa_L$ is the liability vega
$\rho_L$ is the liability rho
Furthermore, it should be noted that the liability delta is defined as the sensitivity of the VAGB valuation to instantaneous changes in stock or stock index levels, the liability vega is defined as the sensitivity of the VAGB valuation to instantaneous changes in stock or stock index implied volatility levels, and the liability rho is defined as the sensitivity of the VAGB valuation to instantaneous changes in interest rates.

Additionally, there are innumerable other Greeks that can be defined and managed as part of a hedge program. Those may include the following additional metrics:

deltas with respect to foreign currency exchange rates,
"partial" or "bucket" vegas which are sensitivities of, the VAGB valuation to implied volatilities of a specific tenor rather than to the implied volatility surface as a whole,
"partial" or "key rate" rhos which are sensitivities of the VAGB valuation to interest rates of a specific tenor rather than to the entire yield curve in parallel,
"correlation vegas" which are the sensitivities of the VAGB valuation to changes in the level of correlation between set of capital markets variables assumed to be stochastic,
"theta," which is the sensitivity of the VAGB valuation to the passage of time,
any number of higher-order sensitivities, and
any number of cross-gammas.

Finally, it should be noted that the above is by no means meant to be an exhaustive list of all possible Greeks, but merely an illustrative description of some Greeks that may be instrumental in understanding the subject matter of the invention.

The following is an example of hedging the liability associated with a VA. Assuming a VA guarantee has been written on a VA contract in which the policyholder's funds are invested in a single asset, and supposing the writing insurance company wishes to implement a 3-Greek first order hedge to offset delta, vega, and rho risk. Let $f_L(x,y,z)$ be the liability valuation estimate computed after a hypothetical change to the underlying stock index of x, a hypothetical change to the underlying index volatility of y, and a hypothetical change to the underlying interest rate term structure of z.

In classic terminology, the three Greeks of the liability would be computed using a finite-differencing methodology as follows:

$$f_L^B = f(0,0,0)$$

$$\delta_L = f_L(1,0,0) - f_L(0,0,0) = f_L(1,0,0) - f_L^B$$

$$\kappa_L = f_L(0,0.01,0) - f_L(0,0,0) = f_L(0,0.01,0) - f_L^B$$

$$\rho_L = f_L(0,0,0.0001) - f_L(0,0,0) - f_L(0,0,0.0001) - f_L^B$$

Similar metrics can be calculated for a portfolio of hedging assets. Using analogous notation, a standard goal of a hedging program would be to formulate a portfolio of hedging assets that, minimally, meets the following criteria:

$$|\delta_A - \delta_L| < \varepsilon_\delta \text{ and/or } \varepsilon_{\delta,1} < \frac{\delta_A}{\delta_L} < \varepsilon_{\delta,2}$$

$$|\kappa_A - \kappa_L| < \varepsilon_\kappa \text{ and/or } \varepsilon_{\kappa,1} < \frac{\kappa_A}{\kappa_L} < \varepsilon_{\kappa,2}$$

$$|\rho_A - \rho_L| < \varepsilon_\rho \text{ and/or } \varepsilon_{\rho,1} < \frac{\rho_A}{\rho_L} < \varepsilon_{\rho,2}$$

Wherein, the $\varepsilon$ ("epsilon") represents tolerance imposed on the management of the portfolio. Notably, they need not be constant, although they are expressed that way above. The above examples demonstrate first-order hedging only in a 3-Greek framework, but similar exercises may be performed related to higher-order Greeks and cross-gammas. That is, second-order Greeks and cross-gammas can be calculated using analogous finite differencing methodologies and analogous hedge tolerances can be defined. Furthermore, each of the above three equations represents the hedging of a different Greek (i.e. delta, vega, and rho). Additionally, the main difference between the first and second condition, in each of the above three equations, is whether the deviation in liability and asset Greeks is viewed on an absolute and/or a relative basis.

The motivation for Greek-matching is to produce gains or losses that offset losses or gains made on the liability. For example, suppose that the price of the underlying asset were to decrease by one. This would result in a change (generally a loss in the case of VA guarantees) of $\delta_L$. However, due to the construction of the asset portfolio, the hedges will experience a change in value (generally a gain in the case of VA guarantee hedges) of $\delta_A$. Since the hedging process ensures that the difference between $\delta_A$ and $\delta_L$ is small, the net economic impact on the company is also small, making the company reasonably indifferent to small changes in these capital market variables.

Among other factors, hedging effectiveness on VA guarantees using generic hedging instruments, known as "vanilla hedging instruments," is dependent upon the size, frequency and correlation of movements in critical capital markets variables. Generally, small changes in valuation inputs will not cause a hedge to materially lose effectiveness. Depending upon the nature of the guarantee written, as well as upon the exact instruments chosen for hedging, there are two characteristics of VA guarantee liabilities that cause hedging ineffectiveness in existing systems for guaranteeing benefits using hedging: 1) the instance where valuation inputs experience large and/or sudden changes, and 2) when several of the inputs move together.

SUMMARY OF THE INVENTION

The present invention comprises a method and system for mitigating risks associated with an insurance instrument. The method includes the steps of determining hedging transactions to meet required characteristics of risks associated with the insurance instrument, and mitigating the risks associated with the insurance instrument by executing hedging transactions.

The insurance contract provides a guaranteed minimum death benefit, a guaranteed minimum income benefit, a guaranteed minimum accumulation benefit and a guaranteed minimum withdrawal benefit.

The insurance instrument may be an annuity contract, a variable annuity contract, or a fixed annuity contract.

An account value of the insurance instrument is determined and the account value is at least in part based on account features of the insurance instrument, or the demographics of a policyholder.

The account features comprise one or more of the following: a product type, a death benefit, a withdrawal amount, a lapse period, a ratchet value, a fund selection, and a rollup value. The demographics of a policyholder of the insurance instrument includes at least one of the following: an age, a gender, and a mortality rate.

The system and method calculates the delta, gamma, vega, theta, rho and other first order, higher order and cross gammas for the insurance product. Then, active hedging is executed.

The present invention also comprises a system and method for hedging risks associated with an insurance instrument with benefits, the method including the steps of providing a plurality of insurance instruments with benefits, calculating a plurality of risk statistics based on characteristics of the plurality of insurance instruments with benefits, and hedging the risks associated with the insurance instruments by purchasing dividend swaps agreements The present invention further comprises a method and system for managing risks associated with an insurance instrument issued by an insurance provider. The system includes a data storage module for storing information associated with the insurance instrument and a computing system in electronic communication with the data storage module and the insurance provider, the computing system including a hedging engine.

The hedging engine is operable to calculate one or more risk statistics based on the information associated with the guaranteed variable annuity contracts and to identify a hedge position to mitigate risks associated with the insurance instrument using derivatives such as dividend swaps.

The hedging engine may include a trading system for executing trades associated with the identified hedge positions.

The computing system may also include a risk assessment module for assessing the risks associated with the issuance of the insurance instrument, the risks including behavior risks and market risks. The computing system includes a display module, a data entry module, a processing module, a calculation module and one or more communication modules. The computer system also includes a reporting module for producing reports of information associated with the insurance instrument.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems and methods for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION

Figure 1:
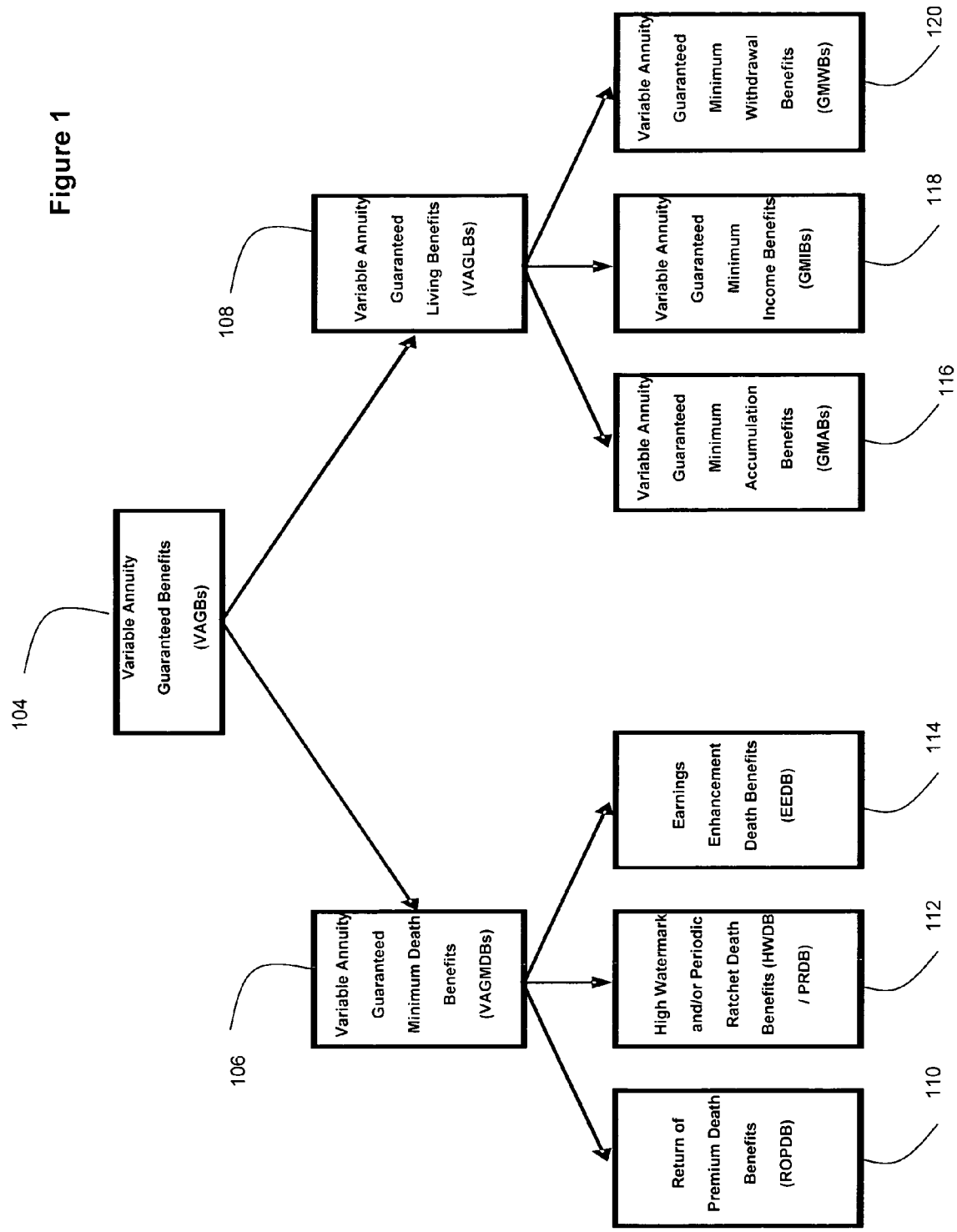
FIG. 1 is a diagram depicting several different categories of variable annuity guaranteed benefits.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Yet further, in most variable annuity products with guaranteed benefit riders, the policyholder may invest in a variety of underlying sub-accounts, in proportions that are selected by the policyholder, although in other non-limiting embodiments, these investments may be subject to various allocation restrictions.

Particularly, variable annuity products have given policyholders a wide array of sub-account styles from which to choose, including but not limited to, money market funds, corporate bond funds, mortgage securities funds, balanced funds, small cap stock funds, mid cap stock funds, large cap stock funds, equity index-tracking funds, international debt and equity funds, and the other similar type of investments. Moreover, the managers of these traditional equity-based mutual funds use the invested cash, received from policyholders, to buy stocks, and therefore, policyholders benefit from dividends paid by stocks held in the fund. Therefore, without considering the investment expenses and fees, policyholders receive "total returns" from their investments in underlying equity-based sub-accounts, as opposed to "price returns." It should be appreciated that "price returns" is the increase in the price of the equity (i.e., capital appreciation component) while "total returns" includes the dividend or distribution component as well as the capital appreciation component.

Further still, when viewed in the context of variable annuity guaranteed benefits (VAGBs), insurers have guaranteed, in a formulaic manner, the total return performance of the underlying sub-account investments. Traditionally, three-Greek variable annuity hedging programs have been buyers of put options on equity indices or baskets of equity indices. In most cases, the level of an equity index does not include the effect of reinvested dividends. Therefore, it is a "price return" index. There are also, in some cases, total return proxy indices that are designed to proxy the total return performance that an investor would have attained by receiving and reinvesting the dividends associated with the underlying constituent stocks.

As an example, the S&P 500 index, whose ticker symbol is "SPX" on the Bloomberg terminal (i.e., a platform that streams the price of various trading data), is a price index, whereas the S&P US 500 Total Return index, whose ticker is "SPTR" on the Bloomberg Terminal, is a total return index associated with the same underlying stocks as those comprising the SPX. Put options listed on exchanges generally correspond to the "price return" version of the index (e.g. the SPX), and as such, the natural tendency in the evolution of over-the-counter ("OTC") equity derivatives trading has been to use the price return indices as underlying assets in most cases. Options on total return indices are also made available in the OTC markets, if requested, but the default is generally the price return index.

As a result of the conditions described above, many hedging programs for variable annuity guaranteed benefits ("VAGBs) are faced with the potential of hedging ineffectiveness owing to the market's expectation of future dividends. As an illustration, consider that under risk-neutral pricing techniques, an investment in an underlying equity sub-account must always be arbitrage-free with respect to the initial yield curve. Therefore, while altering the expectation for dividends payable on the underlying equities would alter the proportion of the total expected performance of the underlying sub-accounts attributable to dividends (and therefore, simultaneously, the proportion attributable to capital appreciation), it would not alter their sum. In other words, the expectation of the total return of the underlying equity index does not change when expected future dividends change, but the composition of that return, (i.e. the proportions attributable to dividends and capital appreciation), would change.

Therefore, since the payouts owed to policyholders, who have elected VAGBs, are tied to the performance of the underlying sub-accounts, which, in turn, have traditionally been tied to the total returns of the equities held in the fund, the market's expectation for future dividend changes may not have a material impact on the valuation of a policyholder's VAGB. By contrast, since traditional put options and other commonly used instruments in variable annuity guaranteed benefits hedging programs have payouts that are generally linked to the price return of equities or equity indices, rather than the total return, the valuation of hedging instruments is altered, in some cases materially, when expected future dividends change.

These phenomena result in a VAGB being much less sensitive to changes in expected future dividends than the price-return-based instruments often chosen as hedges. This means that when expected future dividends change, the valuation of hedging instruments can change significantly, while the change in the corresponding GMDB liabilities may be much lesser, creating unintended hedge ineffectiveness.

Thus, for the above described reasons, existing systems for guaranteeing benefits using hedging are often incomplete and plagued with a lack of certainty that the assets generated from hedging would cover the liability stemming from VAGBs.

Because current hedging programs are incomplete and uncertain, there is a clear need in the art for a system and method to more effectively redistribute the risk associated with variable annuities. The present invention overcomes the various deficiencies associated with traditional hedging programs.

Furthermore, there is a need to institute a mechanism by which to mitigate unintended hedge ineffectiveness arising from changes in the market's expectation of future dividends for those variable annuity hedging programs whose liabilities are tied to the total return performance of the equities held in the underlying sub-accounts, but whose assets, in part or in whole, have payouts linked to price return indices.

The present invention provides a novel approach to mitigate the aforementioned unintended hedge ineffectiveness with respect to future dividends by hedging first-order dividend risk utilizing Dividend Swap Agreements ("Dividend Swaps"). Dividend Swaps are Over-The-Counter ("OTC") contracts where, in one non-limiting example, two parties enter into an agreement to exchange dividends for an asset based on a notional amount tied to the asset, in exchange for dividends based on the same notional amount for an asset tied to a fixed index.

In operation, the Dividend Swap provides a payout to the long position, with the payout calculated as:

N*(D−K)

Where N is the swap notional amount;

D is the sum of the dividends payable to an investor owning one share of the specified equity index between the start and end date of the swap; and K is the strike or breakeven level of dividends.

If D>K, then the short makes a payment to the long equal to N*(D−K); If K>D, then the long makes a payment to the short equal to N*(K−D).

Furthermore, and as disclosed in the present invention, in order to hedge dividend exposure or risk, a VAGB hedging program may take the appropriate position in dividend swaps, so that the net hedging impact is managed to first-order, which greatly reduces the earnings volatility associated with changes in the market's expectation of future dividends.

The following non-limiting embodiment illustrates the hedging exposure to future dividends while utilizing the above-mentioned VAGB hedging program:

On Dec. 31, 2007, an annuity policyholder has elected a GMAB benefit, which guarantees $100, for which the guarantee payout, if any, is payable on Dec. 31, 2009. The value of the policyholder's account is presently $100. The lone investment vehicle in the policyholder's annuity contract is an index fund that precisely tracks the performance of the ABC stock index. There are no fees, taxes, or transactions costs associated with this GMAB benefit. The current level of the ABC stock index is 100. The expectation is that the stocks in the ABC index will pay cumulative dividends of $1 on each of Jun. 30, 2008 and Jun. 30, 2009 for each share of the ABC index owned by the policyholder. The risk-free rate of interest is 5%, continuously compounded, applies for all maturities, and is deterministic. The implied volatility surface for the ABC index is flat at 20%

Let $f^L(x,y,z,d)$ be the estimated value of the VAGB liability, and $f^A(x,y,z,d)$ the estimated value of the hedging portfolio, assuming that:

The level of the ABC stock index is x;

the ABC implied volatility surface of the ABC index is flat at y;

the value of the risk-free interest rate is z; and the expected dividend payable on Jun. 30, 2008 and Jun. 30, 2008 is d.

Suppose the hedging portfolio corresponding to this VAGB guarantee consisted of:

0.75 European put options on the ABC index with an expiration date of Dec. 31, 2008 and a strike price of $90;

1.02554 European put options on the ABC index with an expiration date of Dec. 31, 2009 and a strike price of $80;

A position of $0 in a 1 yr dividend swap with a strike of $1;

A short position of 0.04119 shares of the ABC index; and

A 1 yr zero-coupon bond with a face value of 32.89649

The valuation and liabilities of the shares and zero-coupon bond disclosed above are estimated using either analytic methods or a 100,000-path Monte Carlo simulation (for the options and the VAGB liability disclosed above), and Table 1, shown below, summarizes the valuation of these instruments under the base market environment described above, as well as under various perturbed markets.

TABLE 1

| Instrument | Units | Base Valuation | Valuation with Implied Volatilities at 21% | Valuation with expected dividends of 1.1 per year | Valuation with the ABC index price at 101 | Valuation with the risk-free rate at 5.01% |
|---|---|---|---|---|---|---|
| 1 yr, 90-strike ABC put | 0.75000 | 1.903 | 2.119 | 1.921 | 1.754 | 1.902 |
| 2 yr, 80-strike ABC put | 1.02554 | 1.841 | 2.127 | 1.869 | 1.727 | 1.838 |
| 1 y Dividend Swap | 0.00000 | 0.000 | 0.000 | 0.000 | 0.000 | 0.000 |
| ABC Index Shares | (0.04119) | (4.119) | (4.119) | (4.119) | (4.160) | (4.119) |
| 1 yr Zero-Coupon Bond | 32.89649 | 31.292 | 31.292 | 31.292 | 31.292 | 31.289 |
| Total Assets | | 30.917 | 31.419 | 30.963 | 30.613 | 30.910 |
| VAGB | 1.000 | 6.649 | 7.151 | 6.650 | 6.344 | 6.642 |

Through finite differencing, the first-order Greeks of the liability and hedging portfolio may be calculated using the information above. In one non-limiting embodiment, the first-order Greeks, restricted to one-sided differencing, are defined as:

Liability "Delta" is equal to $f^L(x+1,y,z,d)-f^L(x,y,z,d)$

Liability "Vega" is defined as $f^L(x,y+0.01,z,d)-f^L(x,y,z,d)$

Liability "Rho" is defined as $f^L(x,y,z+0.0001,d)-f^L(x,y,z,d)$

Liability "Psi" is defined as $f^L(x,y,z,d+0.10)-f^L(x,y,z,d)$

It should be appreciated that the first-order Greeks for Assets are calculated utilizing substantially similar one-sided differencing equations. The results obtained from running these calculations are displayed in Table 2 below:

TABLE 2

| Greek | Asset | Liability | Net |
|---|---|---|---|
| Delta | (0.305) | (0.305) | 0.000 |
| Vega | 0.502 | 0.502 | (0.000) |
| Rho | (0.008) | (0.008) | (0.000) |
| Psi | 0.046 | 0.001 | 0.045 |

The portfolio is therefore hedged to first order on the basis of Delta, Vega, and Rho, and therefore resembles some traditional variable annuity hedging strategies. However, the net first-order exposure to Psi has not been hedged.

Yet further, if the market moves such that the value of the ABC index is 99.50, the ABC index implied volatility surface is flat at 20.15%, the risk-free rate is 4.99%, and the expected dividends fall to 0.6, then using the equations for calculating first-order Greeks utilizing finite-order differencing, the new value of the instruments and the VAGB, post-shock, are shown in Table 3:

TABLE 3

| Instrument | Units | Valuation Pre-Shock | Valuation Post-Shock |
|---|---|---|---|
| 1 yr, 90-strike ABC put | 0.75000 | 1.903 | 1.945 |
| 2 yr, 80-strike ABC put | 1.02554 | 1.841 | 1.831 |
| 1 y Dividend Swap | 0.00000 | 0.000 | 0.000 |
| ABC Index Shares | (0.04119) | (4.119) | (4.098) |
| 1 yr Zero-Coupon Bond | 32.89649 | 31.292 | 31.295 |
| Total Assets | | 30.917 | 30.973 |
| VAGB | 1.000 | 6.649 | 6.887 |

Table 3 shows that the asset portfolio has increased in value by an amount equal to 30.973−30.917=0.056, while the VAGB valuation has increased by an amount equal to 6.887−6.649=0.238. The company has therefore suffered a net economic loss of 0.182.

In another non-limiting embodiment and best shown in Table 4, the performance of the hedging portfolio is disclosed and shows what the values would be if the hedging portfolio were to hold a short position of 0.47291 in the 1 yr dividend swap, while the revised valuations and net Greek profiles are shown in Table 5:

TABLE 4

| Instrument | Units | Base Valuation | Valuation with Implied Volatilities at 21% | Valuation with expected dividends of 1.1 per year | Valuation with the ABC index price at 101 | Valuation with the risk-free rate at 5.01% |
|---|---|---|---|---|---|---|
| 1 yr, 90-strike ABC put | 0.75000 | 1.903 | 2.119 | 1.921 | 1.754 | 1.902 |
| 2 yr, 80-strike ABC put | 1.02554 | 1.841 | 2.127 | 1.869 | 1.727 | 1.838 |
| 1 y Dividend Swap | (0.47291) | 0.000 | 0.000 | (0.045) | 0.000 | 0.000 |
| ABC Index Shares | (0.04119) | (4.119) | (4.119) | (4.119) | (4.160) | (4.119) |
| 1 yr Zero-Coupon Bond | 32.89649 | 31.292 | 31.292 | 31.292 | 31.292 | 31.289 |
| Total Assets | | 30.917 | 31.419 | 30.918 | 30.613 | 30.910 |
| VAGB | 1.000 | 6.649 | 7.151 | 6.650 | 6.344 | 6.642 |

TABLE 5

| Greek | Asset | Liability | Net |
|---|---|---|---|
| Delta | (0.305) | (0.305) | 0.000 |
| Vega | 0.502 | 0.502 | (0.000) |
| Rho | (0.008) | (0.008) | (0.000) |
| Psi | 0.001 | 0.001 | 0.000 |

The performance of the hedging program on a before-and-after basis would therefore be as shown in Table 6 below.

TABLE 6

| Instrument | Units | Valuation Pre-Shock | Valuation Post-Shock |
| --- | --- | --- | --- |
| 1 yr, 90-strike ABC put | 0.75000 | 1.903 | 1.945 |
| 2 yr, 80-strike ABC put | 1.02554 | 1.841 | 1.831 |
| 1 y Dividend Swap | (0.47291) | 0.000 | 0.180 |
| ABC Index Shares | (0.04119) | (4.119) | (4.098) |
| 1 yr Zero-Coupon Bond | 32.89649 | 31.292 | 31.295 |
| Total Assets | | 30.917 | 31.153 |
| VAGB | 1.000 | 6.649 | 6.887 |

While the VAGB has still increased in value by 0.238, the hedging portfolio has now generated a gain of 31.153−30.917=0.238, for a net gain of 0.002. It should be appreciated that the calculated net gain 0.002 was calculated from numbers inputted from a spreadsheet (not shown), and the discrepancy in math is not an error but accountable to the rounding off of numbers from the spreadsheet. Thus, hedging dividend risk to first-order has materially lowered the overall volatility in hedging performance.

The present invention utilizes customized derivatives to hedge first-order dividend risk utilizing Dividend Swap Agreements.

Figure 2:
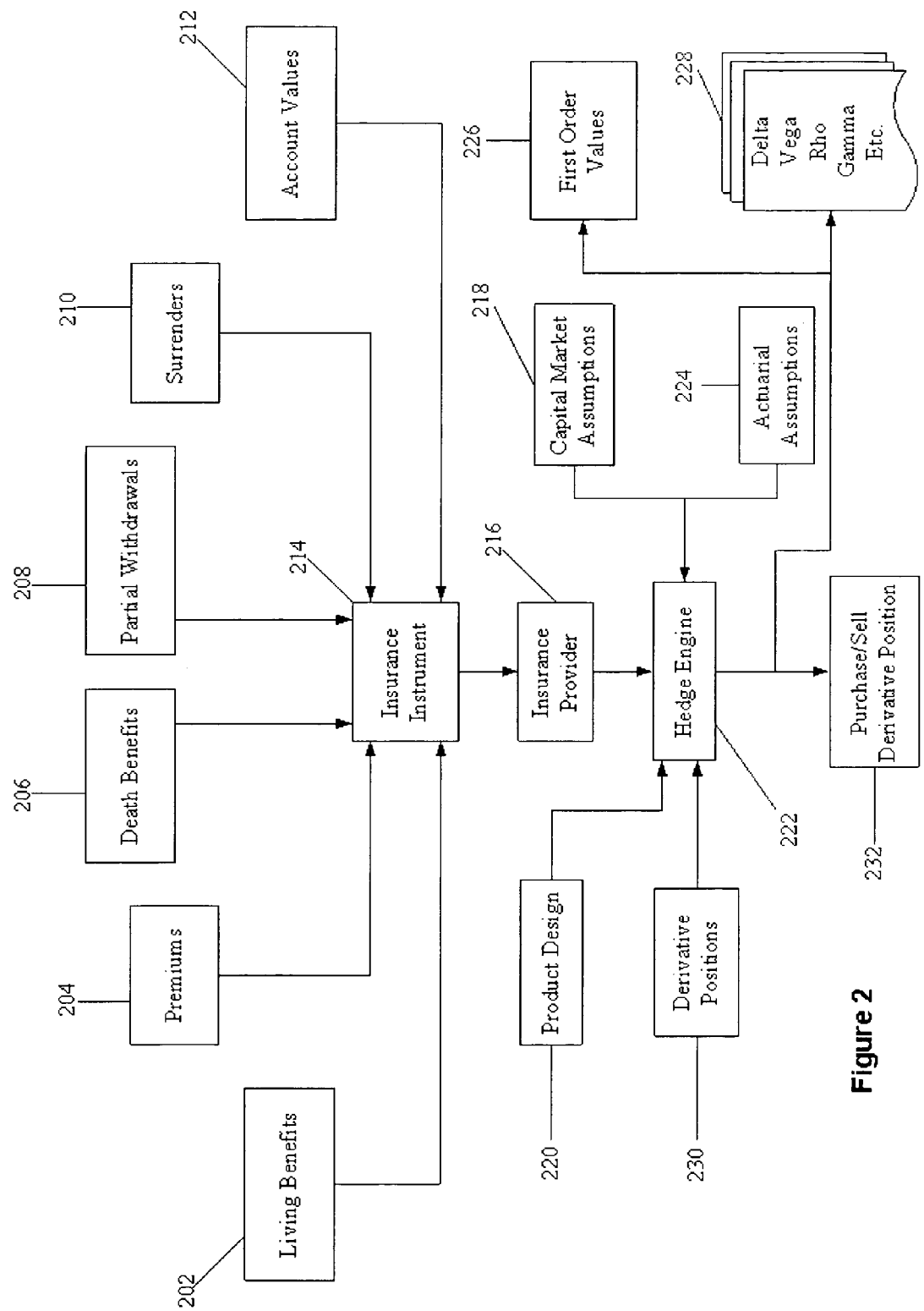
FIG. 2 is a diagram depicting a method for an insurance provider to reduce the risk of providing the insurance instrument in accordance with an embodiment of the present invention.

FIG. 2 is a diagram depicting a method for an insurance provider to reduce the risk of providing the insurance instrument. The premium payments 204, death benefits in-force 206, living benefits 202, partial withdrawals 208, surrenders 210 and account values 212 are summarized into in-force contract details 214. The data is forwarded to the insurance provider 216, and analyzed. One aspect of the analysis summarizes the in-force data of all the contracts. The output from the in-force contract detail system is fed into the hedge engine 222. The hedge engine 222 projects forward the financial results obtained for the company based upon the types of investments in the variable accounts and capital market assumptions.

The product characteristics 220 of the insurance instrument are input into the hedge engine 222. Product characteristics 220 include: living benefit guarantees, death benefit guarantees, minimum income guarantees, etc.

Capital market assumptions 218 are input into the hedge engine 224. These assumptions include risk free rates, volatilities, correlations of funds, and any other statistical measurements and data describing the conditions of the capital markets. Risk neutral and real world assumptions may also be used as input items.

The characteristics of the derivative positions 230 are also used as inputs into the hedge engine 222. The hedge engine calculates the first order values 226, although in other non-limiting embodiments, higher-order and cross-gamma values may also be calculated.

Actuarial assumptions 224 are used to provide mortality rates, surrender rates, partial withdrawal rates, fund mapping and expenses. Wherein, fund mapping is the process of analyzing separate account funds and assigning them to indices that can be hedged.

The hedge engine 222 calculates the amount of available options to be purchased and uses cash and derivative options.

The output from the hedge engine 222 is the specific buy and sell positions 232 that provide the balance.

Figure 3:
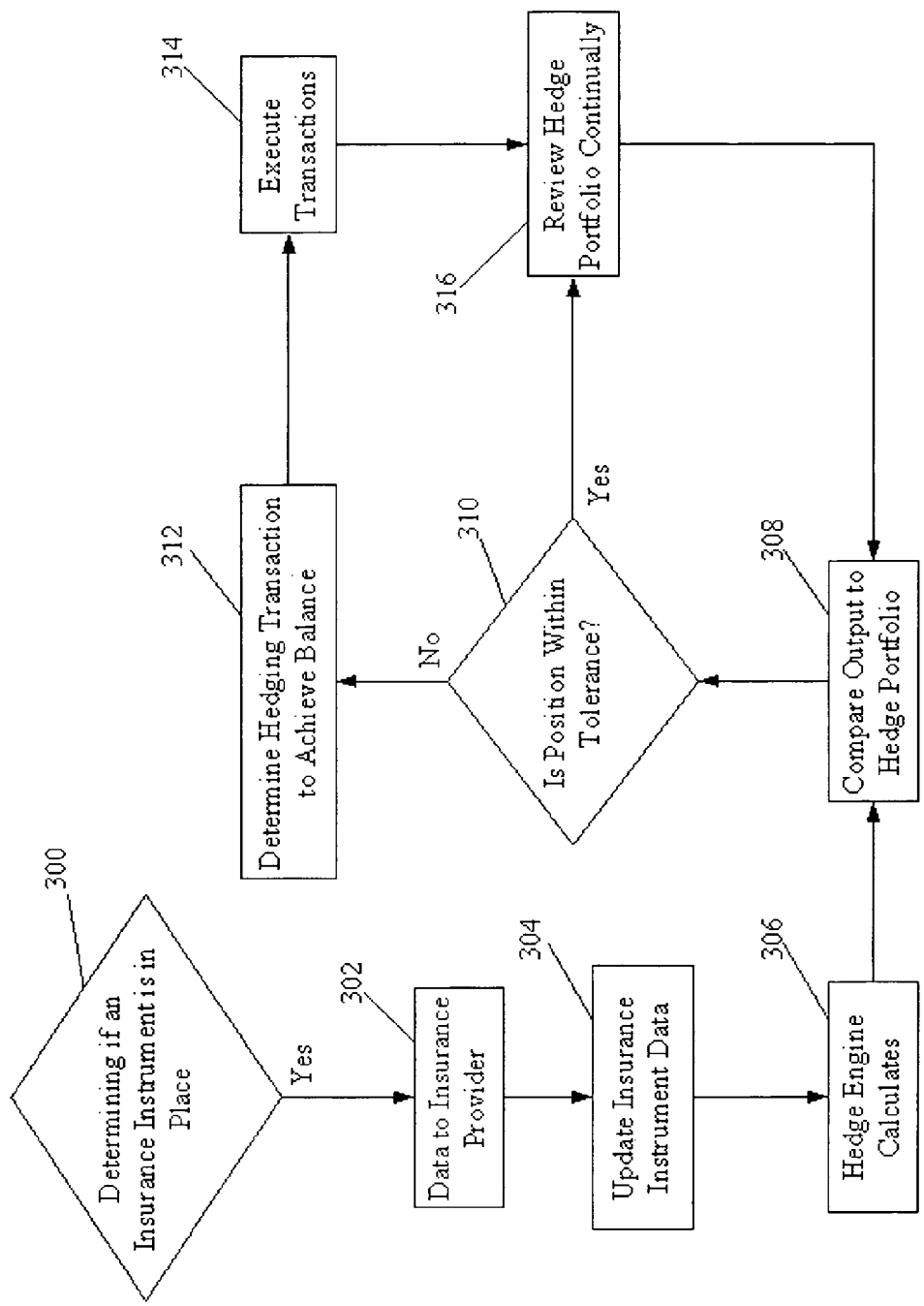
FIG. 3 is a diagram depicting the method by which the system of the present invention reviews and adjusts hedge positions for hedging the risks inherent in an insurance instrument in accordance with an embodiment of the present invention.

FIG. 3 depicts the method by which the system of the present invention reviews and adjusts hedge positions for hedging the risks inherent in an insurance instrument. The procedure starts in step 300, it is determined if an insurance instrument is in place with the insurance provider in step 301. If such an instrument is in place, the data describing the various characteristics of the instrument is sent to the insurance provider 302. The insurance instrument data is updated 304 and supplied to the hedge engine. The hedge engine, using the above described inputs, calculates 306 one or more portfolios that include various hedge positions for hedging the risks inherent in the insurance instrument.

One or more of the resulting portfolios is then selected as the desired portfolio. The result is compared 308 to the existing portfolio. One or more tolerance bands may be established to determine if adjustments to the portfolio are necessary and used when comparing the existing portfolio to the new portfolio 310. It is determined if the review process is to continue in step 316, if the new portfolio is within the tolerance bands the review process continues in step 308. However if it is determined that the review process is not to continue, the procedure ends in step 318.

However, if the selected portfolio is outside the established tolerances, the hedge transactions that will create the selected portfolio are determined 312, and executed 314. The procedure ends in step 318.

The procedure described in FIG. 3 may be implemented by: an insurance provider, a reinsurance provider, a derivative counter party, and any other relevant party concerned with the hedging aspect of the present invention.

Figure 4:
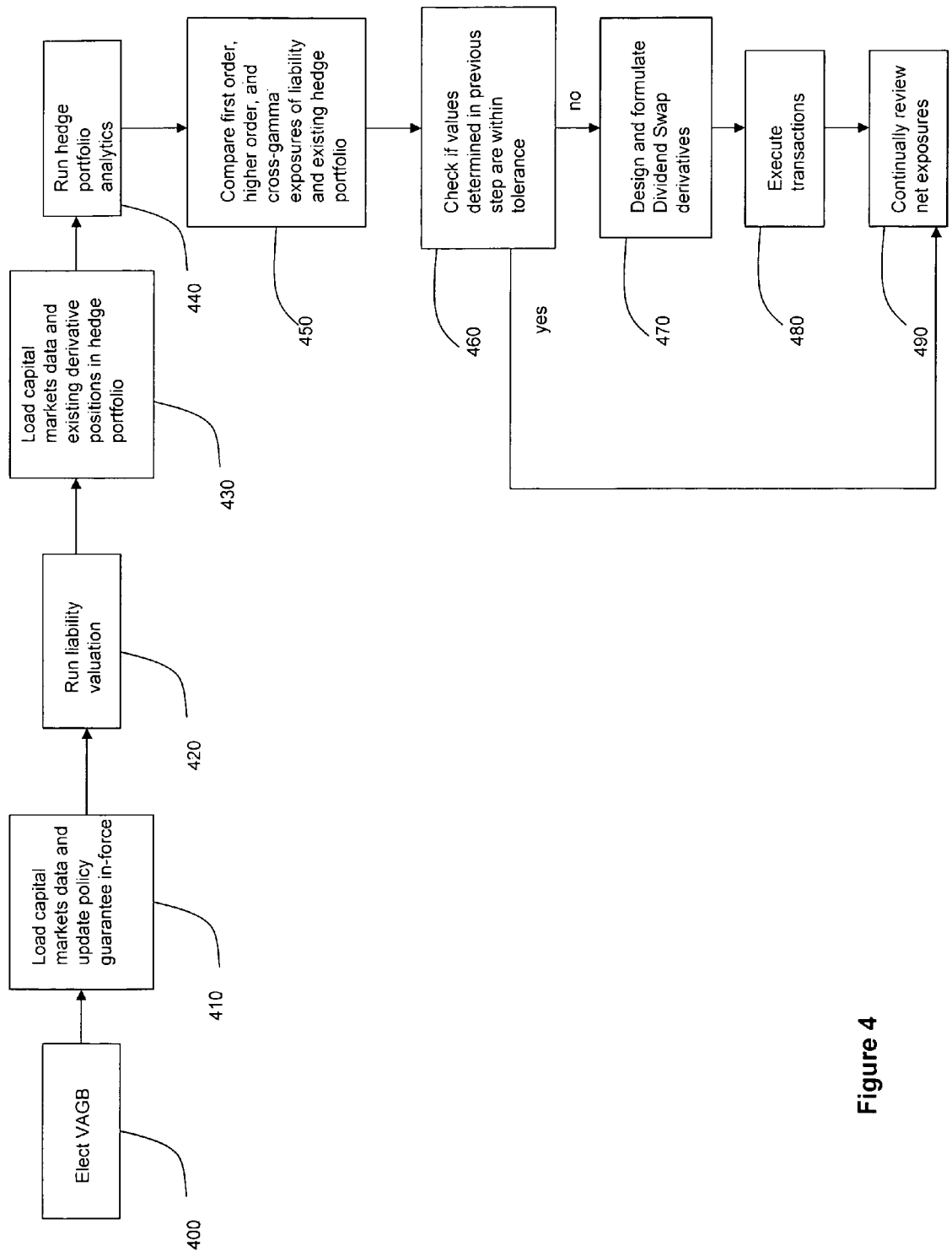
FIG. 4 is a flow chart depicting the hedging method for a dividend swaps agreement in accordance with an embodiment of the present invention.

The following depicts the hedging methods, which are described more specifically in FIG. 4. Hedging programs can vary significantly but generally proceed according to the following pseudo-algorithm:

Construction of a mathematical valuation model to compute an estimate of the value of the written guarantee liability, conditional upon a set of relevant capital markets data and assumptions for annuitant behavior.

Gathering required capital markets data, dependent upon the structure of the guarantee and the contractually permissible set of investment options, but generally including:

The spot price of relevant equity indices.

The term structure of interest rates denominated in all of the currencies that are reflected in the valuation model.

The spot price of relevant cross-currency exchange rates associated with all of the currency pairs that are reflected in the valuation model.

The forward implied dividend curves for each of the relevant equity indices.

A sub-model for the volatility associated with the price of the equity indices.

A sub-model for the volatility associated with the relevant cross-currency exchange rates.

A sub-model for the volatility associated with the interest rates of all relevant term structure.

Formulating assumptions of annuitant behavior, dependent upon the structure of the guarantee, but generally including:

Assumed rates of mortality for individual annuitants, or a sub-model for stochastic mortality.

Assumed rates of lapsation for individual annuitants and/or a predefined algorithm (deterministic or stochastic) for future lapsation rates that is a function of other variables in the valuation (so-called "dynamic lapsation").

Assumed rates of utilization for behavioral choices granted to the contract holder under the terms of the guarantee, such as size and frequency of periodic withdrawal of funds from the variable annuity contract and/or a predefined algorithm (deterministic or stochastic) for future utilization that is a function of other variables in the valuation ("dynamic utilization").

Size, style and frequency of transfer of funds between investment options and/or a predefined algorithm (deterministic or stochastic) for future transfers that is a function of other variables in the valuation.

Defining a series of sets of unexpected fluctuations ("shocks") to be applied to capital markets data.

Running the valuation model and computing an estimate of the valuation of the written liability under the "base case" market data and under each set of shocks. This information can be used to determine an estimate of the base valuation of the written liability and of the sensitivities of the valuation estimate to changes in specific capital markets data. (The estimate of the base valuation of the written liability and the estimate of the sensitivities of the valuation estimate to changes in specific capital markets data are known in the art as "Greeks").

Formulating a hedge portfolio and executing an analogous valuation/sensitivity exercise to calculate the base valuation and the Greeks.

Executing trades in the hedge portfolio that position the aggregated Greeks of the hedge portfolio to be within desired ranges relative to the liability Greeks.

FIG. 4 depicts the hedging methods of an embodiment of the present invention. The method starts in step 400, the updated in-force policy, guarantee, and capital markets data loaded in step 410, the liability valuation engine is run in step 420, the existing derivative positions in hedge portfolio and capital markets data are loaded in step 430, running the hedge portfolio analytics in step 440, comparing the first-order exposures of liability and existing hedge portfolio 450, the values determined in step 450 are checked against a predetermined tolerance in step 460, if the values are within tolerance steps 470 and 480 are skipped and the net exposures are continuously reviewed in step 490. However if the values are determined to not be within the tolerance in step 460 dividend swap derivatives are designed and formulated in step 470, the transactions are then executed in step 480, subsequently the net exposures are continuously reviewed in step 490 and the procedure ends in step 500.

Unlike standard vanilla call and put options, dividend swap derivatives do not conform to a single payoff function definition, owing to the very unique structuring opportunities within the OTC derivatives market. In general, these structures will combine the performance of a swap notional amount, a sum of dividends payable to an investor owning one share of the specified equity index between the start date and the end date of the swap, and the strike level of dividends. However, there are many other designs, which may be used to without departing from the spirit of the present invention. The list below details some of those examples; nevertheless, it should not be considered exhaustive:

Equity, equity index, equity basket, or equity index basket options, swaps, or other derivatives that produce expanded or contracted notional based upon the level of an interest rate or a combination of interest rates or on the spread between two or more interest rates.

Equity, equity index, equity basket, or equity index basket options, swaps, or other derivatives that "knock in" or "knock out", or some variation, based upon one or more interest rates reaching or falling below certain levels.

Interest rate swaps, caps, floors, swaptions, options, or other derivatives whose notional expands or contracts, or for which the amount of leverage is otherwise changed, as a function of the level of stocks or stock indices.

Equity, equity index, equity basket, or equity index basket option, swap, or other derivative whose moneyness is altered in some way based upon the level of an interest rate or a combination of interest rates or on the spread between two or more interest rates, either by adjusting the strike price of the option or by altering the contractually realized number, which, for the purposes of the option's payoff, will be considered the "fixing" or "observation" of the underlying(s).

Interest rate swaps, caps, floors, swaptions, options, or other derivatives whose moneyness is altered in some way based upon the level of an individual equity, equity index, basket of individual equities, basket of equity indices, or some combination thereof, either by adjusting the strike price of the option or by altering the contractually realized number, which, for the purposes of the option's payoff, will be considered the "fixing" or "observation" of the underlying(s).

Figure 5:
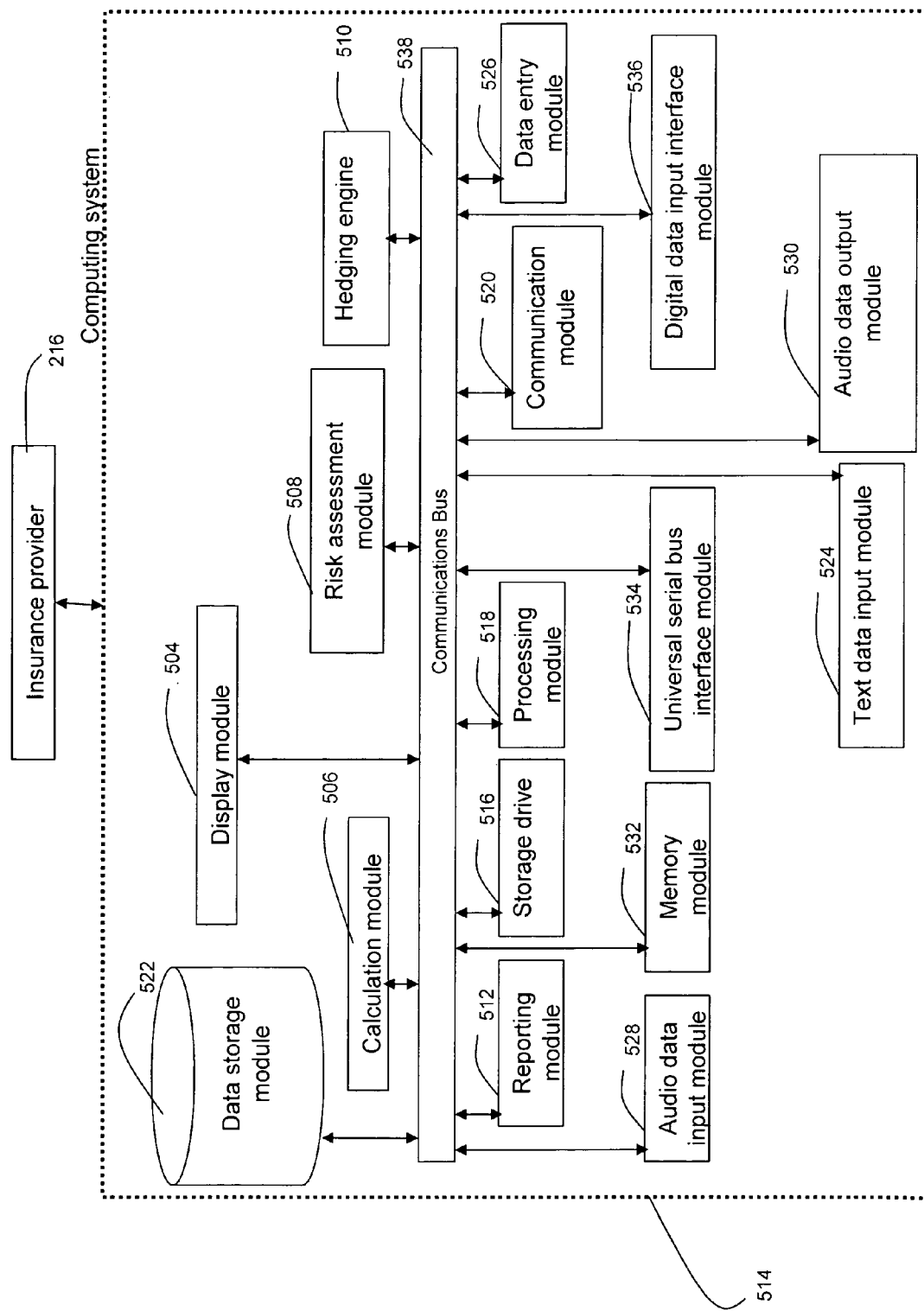
FIG. 5 is a diagram depicting the system on which the methods of the present invention may be implemented in accordance with an embodiment of the present invention

Referring now to FIG. 5, FIG. 5 depicts an embodiment of a system on which the methods described above may be implemented. The present invention relates to a dividend risk hedging system, and discloses a novel method of hedging the risks associated with providing a variable annuity by utilizing dividend swaps. The apparatus and method includes at least one central processing computer or computer network server. Network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, network server may be a conventional standalone server computer or alternatively, the function of server may be distributed across multiple computing systems and architectures.

Network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include a hard magnetic disk drive, optical storage units, CD-ROM drives, or flash memory. Data storage device contains databases used in processing transactions and/or calculations in accordance with the present invention, including at least an insurance subscriber database and an insurance database. In one embodiment, database software creates and manages these databases. Insurance related calculations and/or algorithms of the present invention are stored in storage device and executed by the CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage device may store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, each record includes fields that are specific to the present invention such as interest rates, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software. Suitable computer program code may be provided for performing numerous functions such as mitigating risks associated with an insurance instrument, determining hedging transactions to meet required characteristics of risks associated with the insurance instrument, and mitigating the risks associated with the insurance instrument by executing hedging transactions. The functions described above are merely exemplary and should not be considered exhaustive of the type of function which may be performed by the computer program code of the present inventions.

The computer program code required to implement the above functions (and the other functions described herein) can be developed by a person of ordinary skill in the art, and is not described in detail herein.

All of the modules described herein are operably interconnected via a bi-directional connection with a central serial bus 538. The serial bus 538 serves to receive information from every single module, as well as to transmit information from one module to another. The insurance provider 216 transmits and receives data, to and from the computing system via any standard means known in the art. The communication module 520 transmits and receives data, to and from the computing system 514 via any standard electronic means known in the art. The computing system 514 consists of: a display module 504, a data entry module 526, and a processing module 518. The processing module is generally used to process information as well as to perform any other processes not specifically assigned to any other module within the computing system 514.

Furthermore, the computing system 514 includes a risk assessment module 508, wherein the risk assessment module 508 may be used for assessing the risks associated with the issuance of an insurance instrument, and wherein the risks include market risks and behavior risks.

Additionally, the computing system 514 includes a hedging engine 510. The hedging engine 510 may be used for hedging risks associated with the issuance of an insurance instrument, and for participating in hedging transactions which utilize derivatives.

In addition the computing system 514 includes a reporting module 512. The reporting module 512 may be used for producing reports of information associated with said insurance instrument, as well as any other kinds of related reports.

The data storage module 522 may be external to the computing system 514, for the purposes of allowing further controls of data access, to be implemented if needed. However, a data storage module 522 which is internal to the computing system 514 may be used without departing from the spirit of the present invention.

Additionally, the computing system 514 includes: a text data input module 524 for inputting data in the form of text, a data entry module 526 for entering a variety of forms of data and inputting the data into the computing system 514.

Finally, the computing system 514 includes: an audio data input module 528 for receiving and inputting audio information, a calculation module 506 for performing any necessary mathematical calculations, a memory module 532 for temporarily storing information as it is being processed by the processing module 518, a universal serial bus interface module 538 for receiving and transmitting data to and from devices capable of establishing a universal serial bus connection, and a digital data input interface module 536 for receiving data contained in digital storage devices (e.g. floppy disk, zip drive, 8 mm digital tape, etc).

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

Thus, this invention is not limited to the disclosed features and other similar hedging effects may be realized by utilizing a hybrid design with a completely different functional payoff form, this can be done without departing from the spirit of the present invention. Furthermore, risk can be transformed, muted, eliminated, or left unhedged depending on the particular goals of the hedge without departing from the spirit of the present invention.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A system for managing risks associated with an insurance instrument issued by an insurance provider comprising:
   a data storage module for storing information associated with the insurance instrument; and
   a computing system which includes a processor in electronic communication with said data storage module and said insurance provider, said computing system including a risk assessment module for assessing the risks associated with the issuance of said insurance instrument, said risks including behavior risks and market risks, and a hedging engine, wherein said hedging engine is further used to participate in hedging first order dividend risk through transactions, and wherein said transactions utilize dividend swap agreements;
   wherein at least some of said dividend swap agreements have a payout formula that reflects an amount of at least one dividend payable on at least one equity asset.

2. The system of claim 1, wherein said hedging program takes an appropriate position in said dividend swap agreements, whereby said appropriate position manages hedging impact to first-order, and wherein said appropriate position being defined by a payout formula, thereby reducing the earnings volatility associated with changes in the market's expectation for future dividends.

3. The system of claim 2, wherein said payout formula being a function of a notional amount, a sum of dividends payable between a first start date and a second end date, and a breakeven level of dividends.

4. The system of claim 1 wherein said computing system includes a display module, a data entry module, a processing module, a calculation module and one or more communication modules.

5. The system of claim 1 wherein said insurance instrument comprises an annuity contract.

6. The system of claim 1 and further comprising a reporting module for producing reports of information associated with said insurance instrument.

7. The system of claim 1 wherein said hedging engine hedges first order dividend risk associated with said issuance of said insurance instrument.

8. A computer implemented method for mitigating risks associated with an insurance instrument, the method comprising the steps of:
   determining via a computer program in communication with a processor hedging transactions to meet required characteristics of risks associated with the insurance instrument; and
   mitigating via a computer program in communication with a processor the first order dividend risks associated with the insurance instrument by executing hedging transactions, wherein the hedging transactions utilize dividend swap agreements;
   wherein at least some of said dividend swap agreements have a payout formula that reflects an amount of at least one dividend payable on at least one equity asset.

9. The computer implemented method of claim 8 wherein the hedging transactions takes a position in the dividend swap agreements, wherein the position is defined by a payout formula.

10. The computer implemented method of claim 9 wherein the payout formula is a function of a notional amount, a sum of dividends payable between a first start date and a second end date, and a breakeven level of dividends.

11. The computer implemented method of claim 8 wherein the insurance instrument includes a guaranteed minimum death benefit.

12. The computer implemented method of claim 8 wherein the insurance instrument includes a guaranteed minimum income benefit.

13. The computer implemented method of claim 8 wherein the insurance instrument includes a guaranteed minimum accumulation benefit.

14. The computer implemented method of claim 8 wherein the insurance instrument includes a guaranteed minimum withdrawal benefit.

15. The computer implemented method of claim 8 wherein the insurance instrument includes an annuity contract.

16. The computer implemented method of claim 8 wherein the insurance instrument includes one or more of the following features: a product type, a death benefit, a withdrawal amount, a lapse period, a ratchet value, a fund selection, and a rollup value.

17. The computer implemented method of claim 8 wherein the hedging transactions include active hedging, wherein the active hedging comprises:

matching via a computer program in communication with a processor at least one of the delta, gamma, vega, theta, rho or psi to dividend swap agreements.

18. A computer implemented method for hedging risks associated with reinsuring an insurance instrument with benefits, the method comprising:
- providing via a communications module at least one insurance instrument having benefits;
- calculating via a computer program in communication with a processor at least one risk statistic based on characteristics of the at least one insurance instrument; and
- hedging via a computer program in communication with a processor the risks associated with the at least one insurance instrument, wherein the step of hedging the risks associated with the at least one insurance instrument comprises purchasing dividend swap contracts;
- wherein at least some of said dividend swap agreements have a payout formula that reflects an amount of at least one dividend payable on at least one equity asset.

19. The computer implemented method of claim 18 wherein the step of hedging the risks is at least in part based on dividend swap agreements, and wherein the dividend swap agreements exhibit a payoff formula that is a function of a notional amount, a sum of dividends payable between a first start date and a second end date, and a breakeven level of dividends.

20. The computer implemented method of claim 18 wherein the insurance instrument includes at least one reinsured variable annuity contract.

21. The computer implemented method of claim 18 wherein the calculated risk statistics includes a first risk statistic and a second risk statistic, wherein the first risk statistic is at least in part based on the income stream and the second risk statistic is at least in part based on the death payout amount.

* * * * *